United States Patent
Stokes

(10) Patent No.: US 7,971,208 B2
(45) Date of Patent: Jun. 28, 2011

(54) DEVELOPING LAYERED PLATFORM COMPONENTS

(75) Inventor: Michael D. Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 11/566,109

(22) Filed: Dec. 1, 2006

(65) Prior Publication Data

US 2008/0134206 A1 Jun. 5, 2008

(51) Int. Cl.
*G06F 15/163* (2006.01)
(52) U.S. Cl. ........................................ 719/328; 382/162
(58) Field of Classification Search .................... 719/328
See application file for complete search history.

(56) References Cited

U.S. PATENT DOCUMENTS

| | | | |
|---|---|---|---|
| 6,816,168 B2 | 11/2004 | Kumada et al. | |
| 7,055,146 B1 | 5/2006 | Durr et al. | |
| 7,072,507 B2 | 7/2006 | Ohga | |
| 7,076,647 B2 | 7/2006 | Roth et al. | |
| 7,098,586 B2 | 8/2006 | Mukai et al. | |
| 7,394,565 B2 * | 7/2008 | Stokes et al. ................... | 358/1.9 |
| 2004/0186743 A1 | 9/2004 | Cordero, Jr. | |
| 2004/0218811 A1 | 11/2004 | Edge et al. | |
| 2005/0099427 A1 * | 5/2005 | Stokes ........................... | 345/589 |
| 2005/0146734 A1 * | 7/2005 | Stokes et al. ................... | 358/1.9 |
| 2005/0163370 A1 | 7/2005 | Minakuti et al. | |
| 2005/0168596 A1 | 8/2005 | Ito et al. | |
| 2005/0169519 A1 | 8/2005 | Minakuti et al. | |
| 2005/0185837 A1 | 8/2005 | Takano et al. | |
| 2006/0058987 A1 | 3/2006 | Kumar et al. | |
| 2006/0192861 A1 | 8/2006 | Ohga | |
| 2007/0083874 A1 | 4/2007 | Vasudevan et al. | |
| 2007/0109565 A1 * | 5/2007 | Presley et al. .................. | 358/1.9 |

OTHER PUBLICATIONS

PCT Search Report and Written Opinion for PCT Application No. PCT/US2007/086294, mailed Apr. 24, 2008 (15 pages).
Braun, et al., "Color Gamut Mapping in a Hue-Linearized CIELAB Color Space", available at least as early as <<Sep. 25, 2006>>, at http://www.cis.rit.edu/people/faculty/fairchild/PDFs/PRO04.pdf>>, pp. 06.
Fairchild, "A Revision of CIECAM97s for Practical Applications", retrieved at <<http://lcavwww.epfl.ch/~sabines/Cl2001/ref9_3.pdf>>., John Wiley & Sons, Inc., 2001, vol. 26, No. 6, Dec. 2001, pp. 418-427.
Fairchild, et al., "Meet iCAM: A Next-Generation Color Appearance Model", available at least as early as <<Sep. 25, 2006>>, at http://www.cis.rit.edu/mcsl/iCAM/pub/iCAM_CIC10.pdf>>, Rochester Institute of Technology, pp. 08.
Bourgoin, "How to Use the Windows Color System in Devices and Drivers", Copyright 2006 Microsoft Corporation, PowerPoint Presentation, 20 pages, retrieved on Dec. 11, 2009 from <<http://download.microsoft.com/download/5/b/9/5b97017b-e28a-4bae-ba48-174cf47d23cd/PRI039_WH06.ppt>>.

(Continued)

*Primary Examiner* — Hyung S Sough
*Assistant Examiner* — Brian Wathen
(74) *Attorney, Agent, or Firm* — Lee & Hayes, PLLC

(57) ABSTRACT

Various embodiments provide for a layered approach to developing operating system platform components such as a color management system. This can be accomplished by providing new functionality and by utilizing an existing API module comprising existing APIs to receive input that can be associated with either current functionality, legacy functionality, or the new functionality. Furthermore, a rule-based module conceptually located below the operating system's existing public API module can be used to determine the appropriate processing functionality for the received input—which can then be processed accordingly.

19 Claims, 9 Drawing Sheets

OTHER PUBLICATIONS

"Color at Microsoft", MSDN Blogs, XP-002560097, Sep. 29, 2006, 4 pages, retrieved on Dec. 10, 2009 from MSDN Blogs at << http://blogs.msdn.com/color_blog/archive/2006/09/29/Profile-utilization-test-image-and-profile>>.

Bourgoin, "Windows Color System; Evolution in the Microsoft Color Management", Copyright 2005 Microsoft Corporation, PowerPoint Presentation, 38 pages, retrieved on Dec. 10, 2009 at <<http://download.microsoft.com/download/f/0/5/f05a42ce-575b-4c60-82d6-208d3754b2d6/ColorMgmt_Ecosystem.ppt>>.

Bourgin, "WCS Presentation at the 13th Annual IS&T/SID Color Imaging Conference", Jan. 30, 2006, retrieved from the Internet at https://blogs.msdn.com/b/color_blog/archive/2006/01/30/509876.aspx, retrieved on Aug. 17, 2010, 1 page.

\* cited by examiner

DEVELOPING LAYERED PLATFORM COMPONENTS

BACKGROUND

Providing new functionality in an operating system platform can be a difficult and problematic endeavor. Typically, it requires modifying or replacing hard-coded platform components and the application program interface(s) (API(s)) associated with those components. For instance, consider a new operating system platform version which includes an upgraded color management system which provides additional or more sophisticated color processing functionality capable of utilizing new image data and associated metadata. Usually, those APIs in the API module associated with this new functionality and data/metadata are changed so as to be able to recognize and accommodate this new information. Such changes, however, typically cause compatibility problems with respect to legacy applications and/or devices designed to run on the legacy API(s) that are being changed. To remain compatible with the API(s), device vendors are thus often forced to replace or modify their products—which typically entails becoming familiar with the new or modified APIs in the API module before making the necessary programmatic changes.

While some solutions exist, such as treating legacy objects as legacy objects and treating advanced objects as advanced objects, vendors still have the burden of modifying or replacing their applications/devices each time a new version is released, which typically limits modifications and replacements to a single upgrade process.

SUMMARY

The methods and system described below provide for a layered approach to developing operating system platform components such as a color management system. In at least some embodiments, this can be accomplished by providing new functionality and by utilizing an existing API module comprising existing APIs to receive input that can be associated with current functionality, legacy functionality, or the new functionality. Furthermore, a rule-based module conceptually located below the operating system's existing public API module can be used to determine the appropriate processing functionality for the received input—which can then be processed accordingly. As such, processing functionality can be added to the platform in a gradual staged approach without requiring that existing APIs be changed to accommodate the functionality.

DETAILED DESCRIPTION

Overview

The methods and system described below provide for a layered approach to developing operating system platform components such as a color management system. In at least some embodiments, this can be accomplished by providing new functionality and by utilizing an existing API module comprising existing APIs to receive input that can be associated with either current functionality, legacy functionality, or the new functionality. This input can comprise objects such as data, metadata and the like. More specifically, in at least some embodiments, objects can comprise control parameters for various algorithmic processing implementations associated with processing functionality. Furthermore, a rule-based module conceptually located below the operating system's existing public API module can be used to determine the appropriate processing functionality for the received input—which can then be processed accordingly. As such, processing functionality can be added to the platform in a gradual staged approach without requiring that existing APIs be changed to accommodate the functionality.

Exemplary Computing Environment

Figure 1:
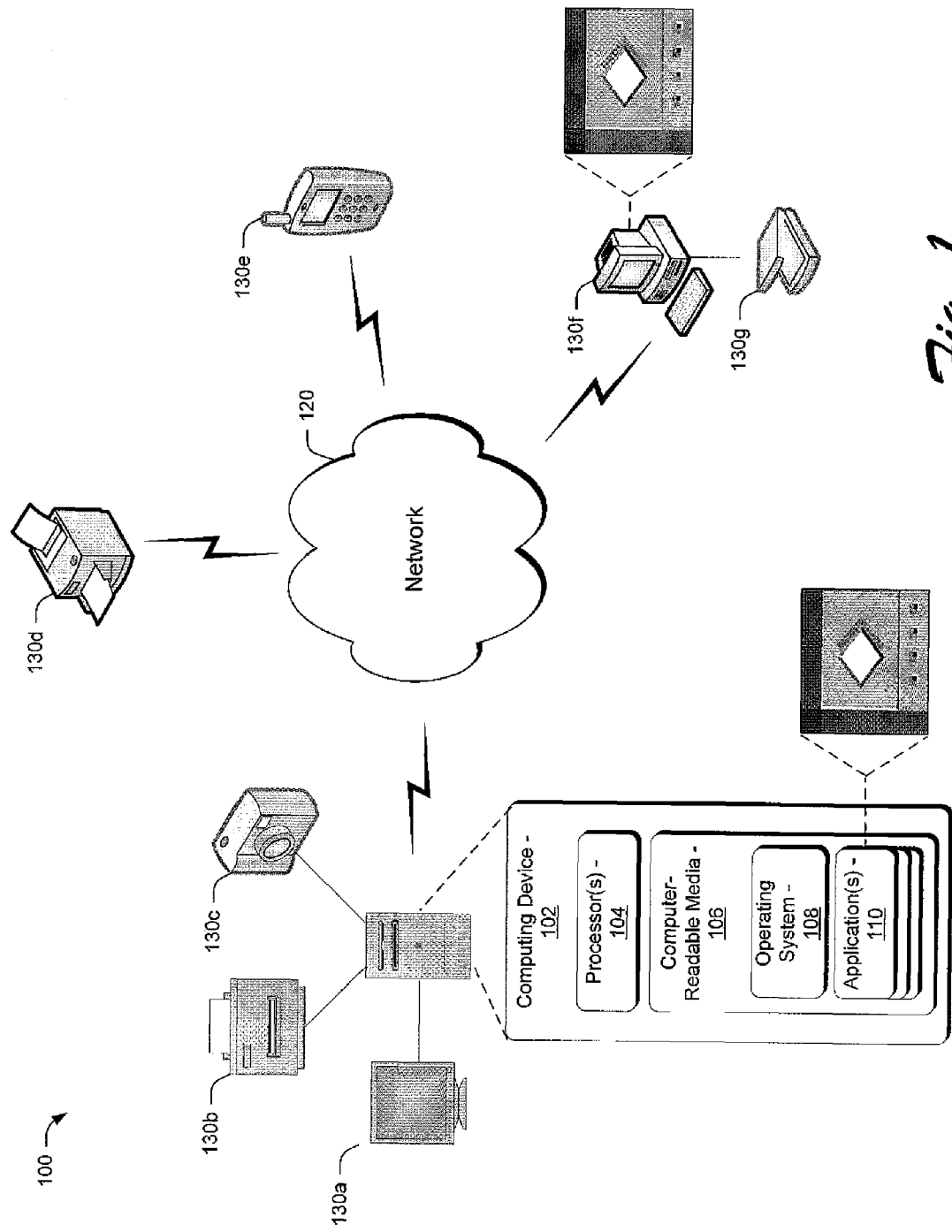
FIG. 1 illustrates a suitable computing environment in which the inventive principles can be employed in accordance with one embodiment.

FIG. 1 illustrates an example of a suitable computing environment 100 in which the system and related methods described below can be implemented. It is to be appreciated that computing environment 100 is but one example of a suitable computing environment and is not intended to suggest any limitation as to the scope of use or functionality of the system. As such, the various described embodiments can be operational with numerous other general purpose or special purpose computing system environments or configurations. Neither should computing environment 100 be interpreted as having any dependency or requirement relating to any one or combination of components illustrated therein.

Computing environment 100 includes, in this example, one or more computing devices 102 each of which includes one or more processors 104 and one or more computer-readable media 106. One or more computer-readable media 106 in turn includes operating system 108 and one or more software applications 110, both of which are executable by the processor(s). The applications can comprise any suitable type of applications including those that present, as part of their functionality, user interfaces to permit interaction with a user.

Although computing device 102 is illustrated in the form of a desktop computer, it is to be appreciated and understood that other computing devices can be utilized without departing from the spirit and scope of the claimed subject matter. Other computing devices can include, by way of example and not limitation, portable computers, handheld computers such as personal digital assistants (PDAs), cell phones, tablet computers, smart phones and the like.

System 100 also includes other devices. Specifically, monitor device 130a, printer device 103b and digital camera device 130c are illustrated as being communicatively coupled directly to computing device 102 and are capable of sending output to, and/or receiving input from computing device 102. Although not explicitly shown, these devices may utilize software (e.g. applications or the like), firmware, or a combination thereof with respect to their operations and communications, as will be understood by one skilled in the art.

A suitable environment can include devices and/or applications that are physically remote but communicatively coupled, without departing from the spirit and scope of the claimed subject matter. Accordingly, system 100 includes devices 130*d* through 130*g* which are communicatively coupled to computing device 102 via network 120 and are capable of sending output to, and/or receiving input from computing device 102. Any suitable network can be utilized, with the Internet being one example. These devices may utilize software, firmware, or a combination thereof with respect to their operations and communications. Furthermore, similar to computing device 102, computing device 130*f* includes one or more software and/or firmware applications, at least one of which is capable of sending input to, and/or receiving input from a computing device, such as computing device 102 for example. Finally, note that while scanner device 130*g* is communicatively coupled directly to computing device 130*f*, it is also communicatively coupled to computing device 102 via computing device 130*f* and network 120.

Note that while in this example devices 130*a* through 130*g* are associated with sending and/or receiving image-related data, any suitable device capable of sending output and/or receiving input can be utilized without departing from the spirit and scope of the claimed subject matter.

Exemplary Embodiment

Figure 2:
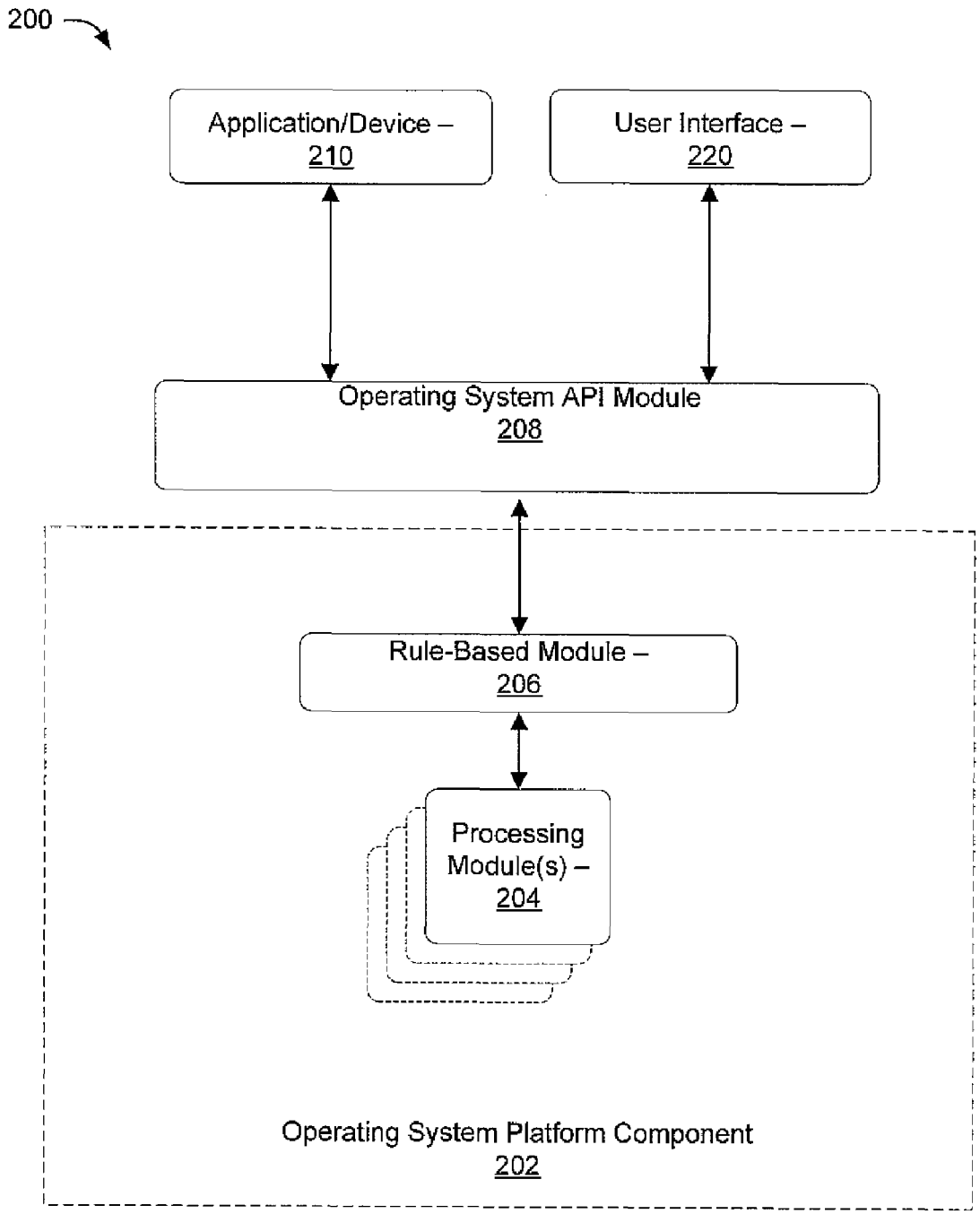
FIG. 2 illustrates an exemplary system in accordance with one embodiment.

FIG. 2 illustrates, generally at system 200, a system in accordance with one embodiment. The system can be utilized to provide for a layered approach to developing operating system platform components. Operating system platform components can include many different types of components. For example, one component type is that which pertains to a color management system that provides legacy, current and new color processing functionality. However, other component types can be utilized as well. By way of example and not limitation, another component type might be an image scaling component that provides simple image scaling (e.g. simple pixel replication) along with a more sophisticated/detailed image scaling solution (e.g. convolution and smoothing algorithms and parameters to adjust those algorithm(s)). Still another example of a component type that might be utilized is a text smoothing component that provides no text smoothing, simple text smoothing (e.g. simple antialiasing) and sophisticated text smoothing (e.g. ClearType subpixel antialiasing).

This layered approach to developing operating system platform components can be accomplished by utilizing an existing API module comprising existing APIs to receive input that can be associated with either current functionality, legacy functionality, or new functionality. A rule-based module can then be used to determine the appropriate processing functionality for the received input—which can then be processed accordingly.

System 200 includes an operating system platform component 202, an operating system API module 208, an application/device 210 and a user interface component 220.

Operating system platform component 202 includes, in this example, one or more processing modules 204 and a rule-based module 206. Processing module(s) 204 provide processing functionality for processing various inputs that can be provided to system 200. Such inputs can comprise objects, such as data and metadata, received or otherwise processed by operating system application program interface module (API) 208. Furthermore, input can be provided by any suitable application or device, such as application/device 210 depicted here.

For purposes of this disclosure, operating system API module 208 can be thought of as comprising those APIs that are publicly available and exposed to devices and software applications and provide a direct way for devices and applications to interact with the operating system, as will be appreciated and understood by one skilled in the art. One commercially-available example of such a module is the Windows® API (informally known as WinAPI) which comprises a core set of available APIs in the Microsoft Windows® operating systems. Note that in this embodiment, API module 208 is depicted as being separate from operating system platform component 202. However, in other embodiments, all or part of the API module can be included in the platform component without departing from the spirit and scope of the claimed subject matter.

Continuing, rule-based module 206 is communicatively coupled to API module 208 and to processing module(s) 204. In addition, rule-based module 206 embodies logic which can be utilized to determine, based on criteria, which processing functionality should be utilized to process received input comprising objects, such as data and metadata. As will be described in further detail below, these criteria can include processing preferences expressed in the rule-based module or in any other suitable location. In addition, these criteria can also include characteristics associated with the objects themselves, such as an explicit reference to processing functionality or parameters that are associated with one or more levels of processing functionality for example.

Note that in this embodiment, operating system platform component 202 is depicted as including rule-based module 206. However, in other embodiments, some or all of the rule-based module can be external to the platform component without departing from the spirit and scope of the claimed subject matter. In addition, rule-based module 206 may be embodied in any suitable form such that it can be used to determine which processing module and processing functionality is appropriate for processing input objects, such as data and metadata. By way of example and not linitation, suitable forms can include: a registry database, hard-coded software, an extensible markup language (XML) database, a text based remote file, a structured query language (SQL) database, document preferences, or the like. Finally, in at least some embodiments, the logic embodied in rule-based module 206 can be defined, modified or overridden by a user by any suitable means. By way of example and not limitation, this can include user input received via a user interface such as user interface 220 depicted here.

Note that by virtue of the fact that rule-based module 206 is separate and conceptually or logically located below operating system API module 208, new processing functionality can be made available and utilized to process received input (comprising objects such as data and metadata) without having to replace or modify existing APIs in API module 208. This is because, as discussed in more detail below, the existing APIs can be used to accommodate input comprising objects associated with new processing functionality even when the existing APIs do not recognize the structure and/or content of the objects. In other words, the existing APIs do not need to recognize input objects associated with new processing functionality or directly interface those objects with the new processing functionality. Instead, the existing APIs only need to interface those objects with the rule-based module 206, where the appropriate processing functionality can then be determined.

This allows new functionality to be added to the operating system platform and made available without requiring users or vendors to wait for a new version of the operating system (with new or modified APIs) to become available. Additionally, vendors are relieved of the burden of having to replace or modify their applications and/or devices to be compatible with new or modified operating system APIs. Instead, each can determine when or if they will modify or replace their products to take advantage of the new functionality. Furthermore, vendors and users can progressively innovate by introducing new functionality in a gradual, staged approach.

Exemplary Method

Figure 3:
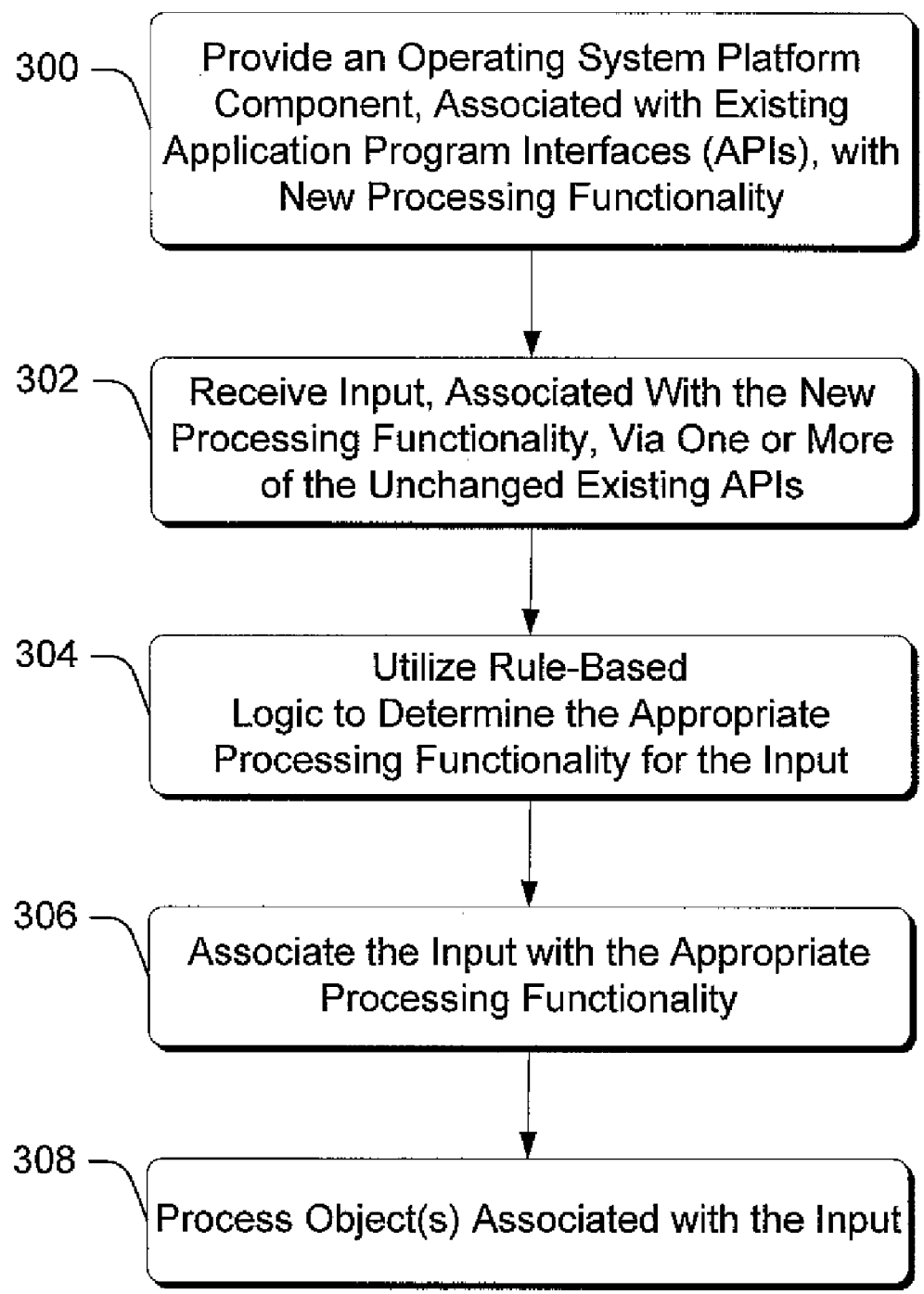
FIG. 3 is a flow diagram that describes steps in a method in accordance with one embodiment.

FIG. 3 is a flow diagram that describes steps in a method in accordance with one embodiment. The method can be implemented in connection with any suitable hardware, software, firmware or combination thereof In one embodiment, at least some of the steps can be implemented by software in the form of an operating system platform associated with one or more computing devices.

Step 300 provides an operating system platform component, associated with existing application program interfaces (APIs), with new processing functionality. Existing APIs typically comprise all or part of an API module, such as operating system API module 208 described above and depicted in FIG. 2. Furthermore, new processing functionality can be any functionality not previously available to the platform component before with respect to performing some sequence of operations on one or more objects. As but one example, which will be described in more detail below, new color processing functionality can be provided by making a new color appearance model available to an operating system's color management system.

Step 302 receives input associated with the new processing functionality via one or more of the unchanged existing APIs. It should be noted that input associated with current operating system functionality or legacy operating system functionality can also be received by the existing API in the same manner. Step 302 is possible because, as briefly noted above, existing APIs in the API module are able to reference and/or accommodate input objects, such as data and metadata, without having to be modified or changed. This can be accomplished in any suitable way. For instance, in at least some embodiments, a structure(s) that is not recognized by an API may be embedded in a tagged portion(s) of a structure that is recognized by the API. As such, the API accommodates the unrecognized metadata structure(s) by simply ignoring it and passing it on.

Step 304 utilizes rule-based logic to determine the appropriate processing functionality for the input. This determination reflects logic in the rule-based module, which can be based on any criteria and may reflect preferences or defaults that have been defined by any suitable means, including by a user via a user interface and/or application. By way of example and not limitation, an input object in the form of metadata that specifically references a particular processing functionality can be processed utilizing that particular functionality. In addition, fall through preferences can also be included so that if the metadata does not reference a particular functionality, the most sophisticated processing functionality available can be utilized.

Step 306 associates the input with the appropriate processing functionality. This can be accomplished by any suitable means. In at least some embodiments, this entails utilizing one or more internal non-public interfaces.

Step 308 processes objects associated with the input. As described above, these objects can comprise data and metadata associated with the data. For example, in at least some embodiments, the data can be an image and the metadata information describing the image—including how the image should be rendered or otherwise consumed. In this regard, processing can include transforming data and/or metadata into a form most suitable for rendering or otherwise consuming by an application and/or device.

Color Management

As noted above, the described principles and methods can be utilized in the context of an operating system module that is a color management system. Accordingly, an exemplary implementation in this context is described in the discussion below. This discussion assumes that the reader is familiar with color appearance models and color management concepts in general. For an overview of color appearance models, the reader is directed to pages 215-229of a text written by Mark D. Fairchild and entitled "Color Appearance Models", published by Addison Wesley Longman, Inc. with copyright 1998. For a discussion of color management concepts with respect to a digital color reproduction system, the reader is directed to a paper written by Michael Stokes and entitled "Color Management Concepts", dated Mar. 5, 2001 and available for download from Microsoft.com. In addition, for information on color management in general, the reader is directed to the International Color Consortium's website at color.org. Finally, for a discussion of color management in the context of the Microsoft Windows® operating systems, the reader is directed to search on Microsoft's website.

While this discussion assumes that the reader is familiar with color appearance models and color management concepts in general, definitions for the following terms are nevertheless included to facilitate the reader in understanding this discussion.

Color Management—color management is the process of ensuring that the colors associated with an image or other media recorded on one device are rendered or otherwise reproduced as accurately as possible on another device. In this respect, the goal is to achieve a "true" or "what-you-see-is-what-you-get" (WYSIWYG) color rendering. Since a user's perception of color is based on which wavelengths reach their eyes, this can be difficult because various devices, such as scanners, monitors, cameras, printers and the like all utilize particular color definition systems and all have a particular range of colors and density values that they are capable of reproducing (the device's "gamut").

Color Space—a theoretical color system wherein recorded raw voltage values can be referenced with respect to colors visible by the human eye. Each dimension approximately correlates with perceived lightness, chroma and hue. Specific devices can be based on a variety of different color spaces such as "red, green, and blue" (RGB), "cyan, magenta, yellow and black" (CMYK), and AdobeRGB. As such, a color management system must be able to transform colors from one color space to another.

Color Management System—a color management system utilizes one or more models and algorithms for color reproduction and provides the engineering necessary to transform color data into a renderable or otherwise reproducible result. As noted above, a color management system transforms colors from one color space to another. In addition, it maps colors between devices having different gamuts and ideally provides a user with accurate image or other media previews that allow them to provide input if deemed necessary. A color management system in an operating system provides a standard means for consistent interchange between devices associated with different color spaces and thus different color profiles. For instance, a user might utilize a scanning device to input an image into a computing device's operating system for display and possible printing. The operating system color management system, in turn, can then process the input image so that it can be displayed, rendered or otherwise reproduced via an application and/or printer as accurately as possible.

By way of example and not limitation, the Windows Vista® operating system includes the Windows Color System (WCS)® which is designed to ensure that color images and other media are rendered as close as possible to their original intent on any device or application despite differences in imaging systems and gamuts between the inputting and rendering devices/applications.

Color Appearance Model—a color appearance model is an abstract mathematical model that uses parameters and algorithms to compute colors encoded in a color space. It can be thought of as including predictors of color appearance attributes, including lightness, chroma and hue. Accordingly, some color spaces may be considered color appearance models. In the most general sense, various color appearance models are associated with various levels of color processing functionality with respect to utilizing data and metadata and transforming colors from one color space to another. As such, different operating system platforms—and different versions of an operating system—that are associated with different color appearance models can incorporate different levels of processing functionality.

By way of example and not limitation, legacy operating systems such as Microsoft's Windows 95®, Windows 98® and Windows XP® include a color management system called Image Color Management (ICM)® which incorporates color processing functionality associated with color spaces/color appearance models such as sRGB and CIELAB. However, as noted above, Windows Vista® operating system includes the Windows Color System (WCS)® which incorporates more advanced color processing functionality by virtue of the fact that it is associated with the color appearance model CIECAM02. For instance, unlike sRGB or CIELAB, CIECAM02 supports image effects such as luminance and background nature. Finally, additional processing functionality not currently provided in CIECAM02 may be available in other color appearance models, such as support for spectral, gloss, translucent, spatial and temporal effects for instance.

Image and other media data and metadata—data and metadata structures associated with images and other media provide a means for communicating color information and parameters with respect to color processing functionality. Specifically, with respect to digital images, data provides the pixel values that comprise an image while metadata is the other information associated with the image.

Exemplary Embodiment for a Color Management System

Figure 4:
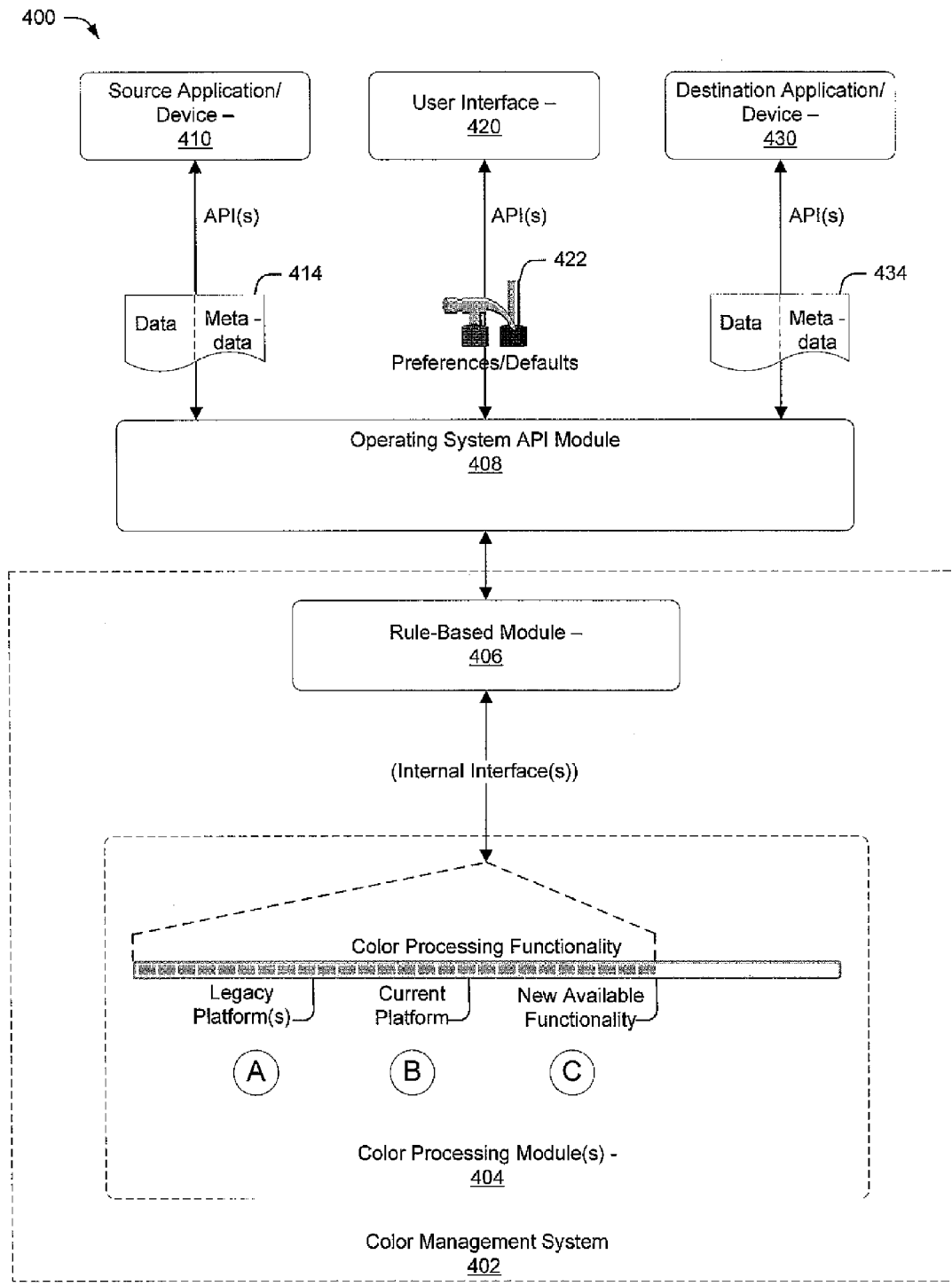
FIG. 4 illustrates an exemplary color management system in accordance with one embodiment.

FIG. 4 illustrates one embodiment in which the principles and methods described below can be implemented, generally at 400. These principles and methods can be used to provide for a layered approach to developing an operating system platform component that is a color management system. However, it is to be appreciated and understood that this constitutes but one example and is not to be used to limit the application of the claimed subject matter. Rather, as noted above, these principles and methods can be employed in other contexts without departing from the spirit and scope of the claimed subject matter.

System 400 includes a color management system 402 which can be implemented as a component of any suitable operating system platform. Color management system 402 includes, among other things, one or more color processing modules 404 which provide a certain level of color processing functionality. Here, note that color processing module(s) 404 is shown as providing more functionality than was originally provided with the current operating system ("current platform"). As described above, this functionality can be provided by any suitable means, such as by adding one or more new color appearance models for example.

Color management system 402 also includes rule-based module 406 which is communicatively coupled with color processing module(s) 404 via one or more internal interfaces which, unlike APIs in API module 406, may not be publicly available to devices and software applications. Rule-based module 406 is also communicatively coupled to operating system API module 408 via any suitable interface. Note that in this embodiment, color management system 402 is depicted as including rule-based module 406. However, in other embodiments, some or all of the rule-based module can be external to the color management system without departing from the spirit and scope of the claimed subject matter.

Like rule-based module 206 above, rule-based module 406 may be embodied in any suitable form such that its logic reflects preferences and/or defaults with respect to which processing functionality is appropriate for processing input objects such as data and metadata. For instance, if new functionality is available in the color management system, a rule can be easily changed via a user interface or other suitable means to utilize that functionality for appropriate metadata when it is received. Alternatively or additionally, the rules can be structured so that the most sophisticated functionality available is automatically selected, thus eliminating the need to change the rules for the newly added functionality.

Continuing, operating system API module 408 comprises APIs publicly available to applications and/or devices such as source application/device 410, destination application/device 430 and user interface 420. This allows source application/device 410 to input image or other media objects, such as data and metadata 414, via one or more API's for processing by color management system 402. This also allows destination application/device 430 to receive processed image/media objects, such as data and metadata 434, that are suitable for rendering, printing, or otherwise consuming. In addition, this allows a user to input, via user interface 420, preferences and/or defaults 422 which can define, modify or override the logic embodied in rule-based module(s) 406.

While source application/device 410 and destination application/device 430 are shown here as distinct entities, it is to be appreciated and understood that some applications/devices can be both a source and destination of image/media data and metadata without deviating from the spirit and scope of the claimed subject matter. Furthermore, for the sake of clarity, user interface 420 is shown here as being distinct from application/device 410 and destination application/device 430. However, this is not to be construed to mean that application/device 410 or destination application/device 430 cannot also comprise a user interface. Finally, note that in this embodiment, system API module 408 is depicted as being separate from color management system 402. However, in other embodiments, all or part of the API module can be included in the management system without departing from the spirit and scope of the claimed subject matter.

Recall from the above discussion that existing APIs in API module 408 can be used to accommodate input objects such as data and metadata that are associated with new processing functionality even though the existing APIs may not recognize the structure and/or content of the objects. As such, both legacy and new data and metadata structures can be passed to the rule-based module 406 so that the appropriate processing functionality can be determined. This allows color management system 402 to provide any color processing functionality associated with any available color appearance model made available to the color processing module(s) 404, whether it be associated with a legacy operating system(s) (legacy platform(s)) or the current operating system version (current platform)—when installed. In addition, new color processing functionality, made available to color processing module(s) 404 after the current operating system version was installed, can also be provided because the hard-coded APIs in API module 408 do not need to be modified or replaced. In other words, new color appearance models or other plug-in functionality can be made available to color processing module(s) 404 (and thus color management system 402) and used for processing at any time, without requiring an API change.

To help the reader appreciate this innovative feature, consider again the above example involving the Windows Vista® operating system that includes the WCS® color management system—which, at least in the first version, incorporates processing functionality associated with the CIECAM02 color appearance model. In the context of FIG. 4, color processing functionality ("B") at the current platform would be that functionality available with respect to the CIECAM02 model. In this same regard, note that functionality ("A") provided by legacy Windows® operating system versions (associated with previous color appearance models such as sRGB and CIELAB) can still be available as well. Finally, as noted above, new functionality ("C") can be added to the current operating system version and made available in a gradual staged manner. As noted above, examples of new functionality can include support for spectral, gloss, or translucent effects not available with functionalities "A" or "B". As such, a layered approach can be taken in developing color management system 402—wherein vendors and users can introduce new color processing functionality and/or input data/metadata that can be utilized by that functionality at any time they deem appropriate.

Exemplary Method for a Color Management System

Figure 5:
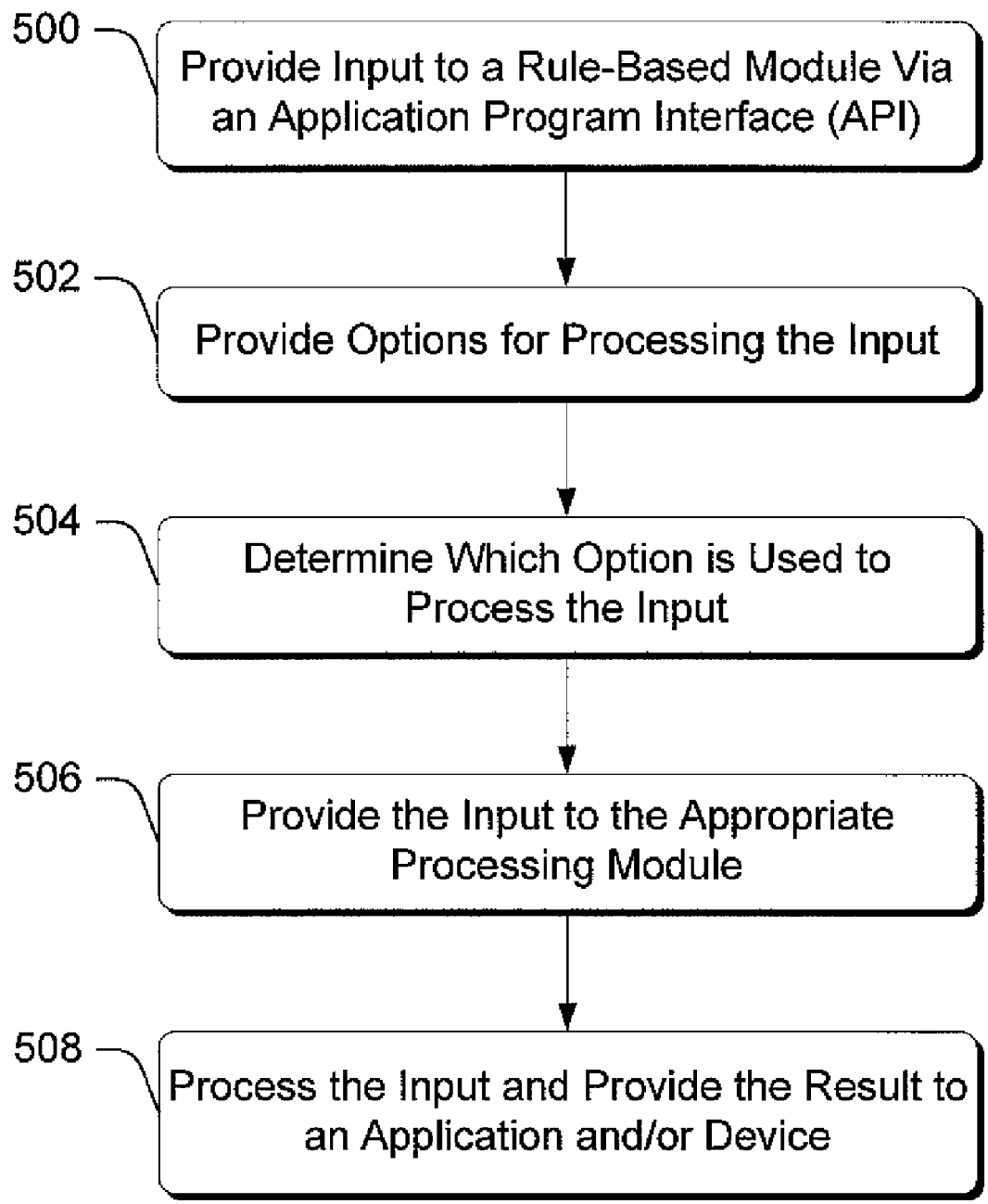
FIG. 5 is a flow diagram that describes steps in a method for a color management system in accordance with one embodiment.

FIG. 5 is a flow diagram that describes steps in a method in accordance with one embodiment in the context of a color management system. The method can be implemented in connection with any suitable hardware, software, firmware or combination thereof. In one embodiment, the method is implemented by software in the form of an operating system platform associated with one or more computing devices.

Step 500 provides input to a rule-based module via an application program interface (APT). In at least some embodiments, this input comprises objects such as source image data and metadata that can be provided in any suitable way. More specifically, in some embodiments, objects can comprise source image data and metadata associated with control parameters for various algorithmic processing implementations associated with processing functionality. For instance, as illustrated above in FIG. 1, devices such as printers, cameras, printers, scanners and computing devices (which may utilize software, firmware, or a combination thereof) and applications can input source image data and metadata to a computing device which includes an operating system APT module and a rule-based module.

Furthermore, recall that the API can accommodate input data and metadata even when it does not recognize its structure and/or content. In other words, legacy APIs can be used to provide new image data/metadata that they may not have been originally designed to recognize or accommodate. This can be accomplished in any suitable way. For instance, in at least some embodiments, a new image data/metadata structure based on extensible markup language (XML) can be accommodated by an API designed for a legacy tagged image file format (TIFF) structure by embedding the XML in a private TIFF tag. As such, the API accommodates the metadata structure by simply ignoring it and passing it on.

Step 502 provides options for processing the input. As described above, these options comprise the available color processing functionality provided by one or more color processing modules, such as color processing module(s) 404 depicted in FIG. 4. Recall that since the APIs do not need to be changed, these options can include legacy processing capabilities, current processing capabilities and new processing capabilities made available after any API changes were made.

Step 504 determines which option is used to process the input. This is accomplished by utilizing the logic of the rule-based module to determine the appropriate color processing functionality for the data and metadata. As described above, this logic can be based on any criteria and may reflect preferences and/or defaults that have been defined by any suitable means, including via a user interface or other suitable means. For example, again consider the embodiment described above where input comprising new image data/metadata based on XML is embedded in a private TIFF tag so that it can be accommodated by an existing API. Based, at least in part, on the presence of this information in the private TIFF tag, rule-based logic can be used to determine which processing functionality is to be used.

Step 506 provides the input to the appropriate processing module. As noted above, this can be accomplished by any suitable means, such as by utilizing an internal interface for example. Step 508 thereafter processes the data/metadata and provides the processed data/metadata to an application and/or device. As described briefly above, and as will be understood and appreciated by one skilled in the art, this typically includes transforming and mapping image/media data and/or metadata so that the resultant processed data and/or metadata can be utilized by an application and/or device to display, render or otherwise reproduce the image or other media as accurately as possible.

IMPLEMENTATION EXAMPLE

Figure 6A:
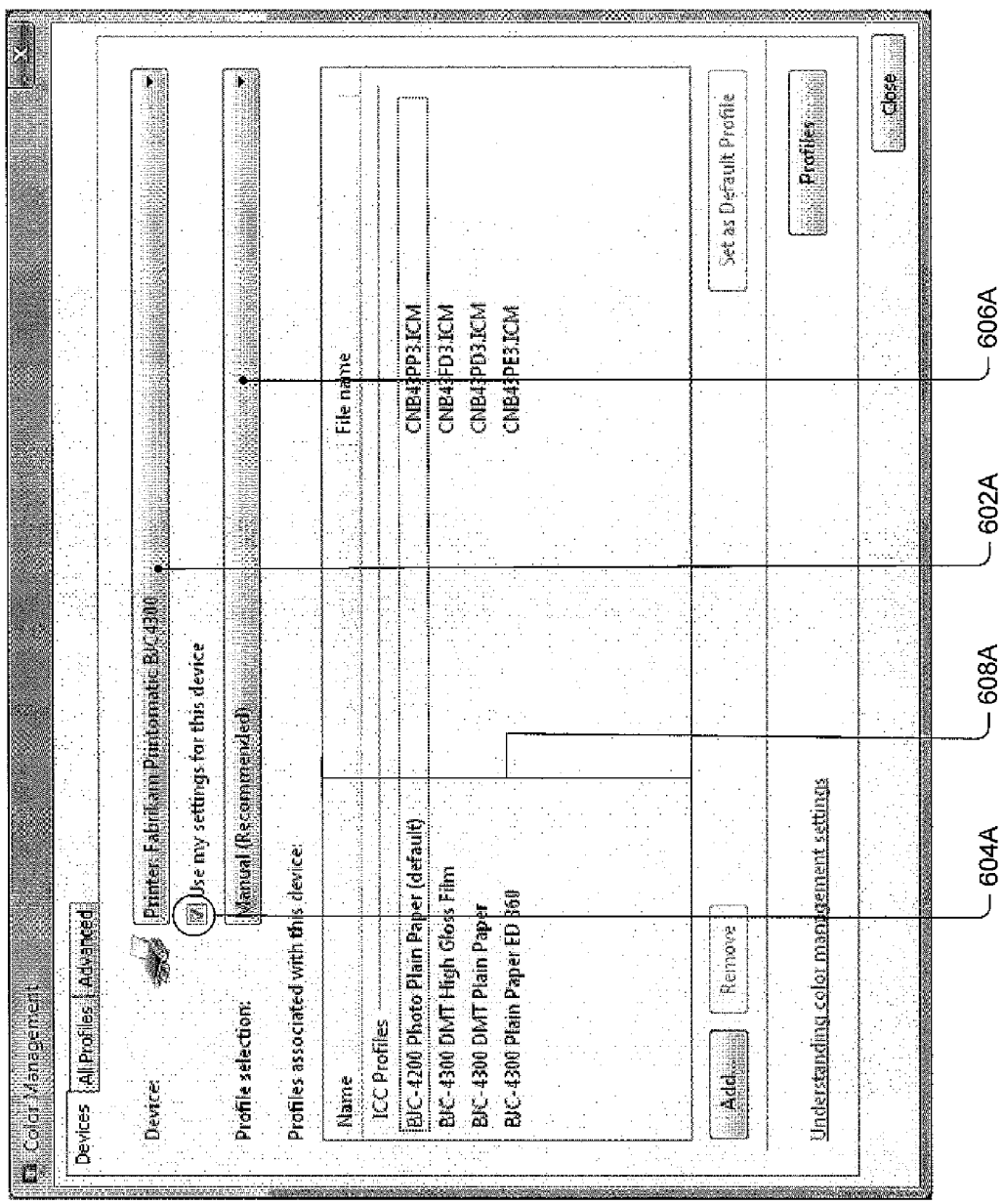
FIGS. 6A-6C illustrate user interface screens of an exemplary user interface in accordance with one embodiment.
Figure 6B:
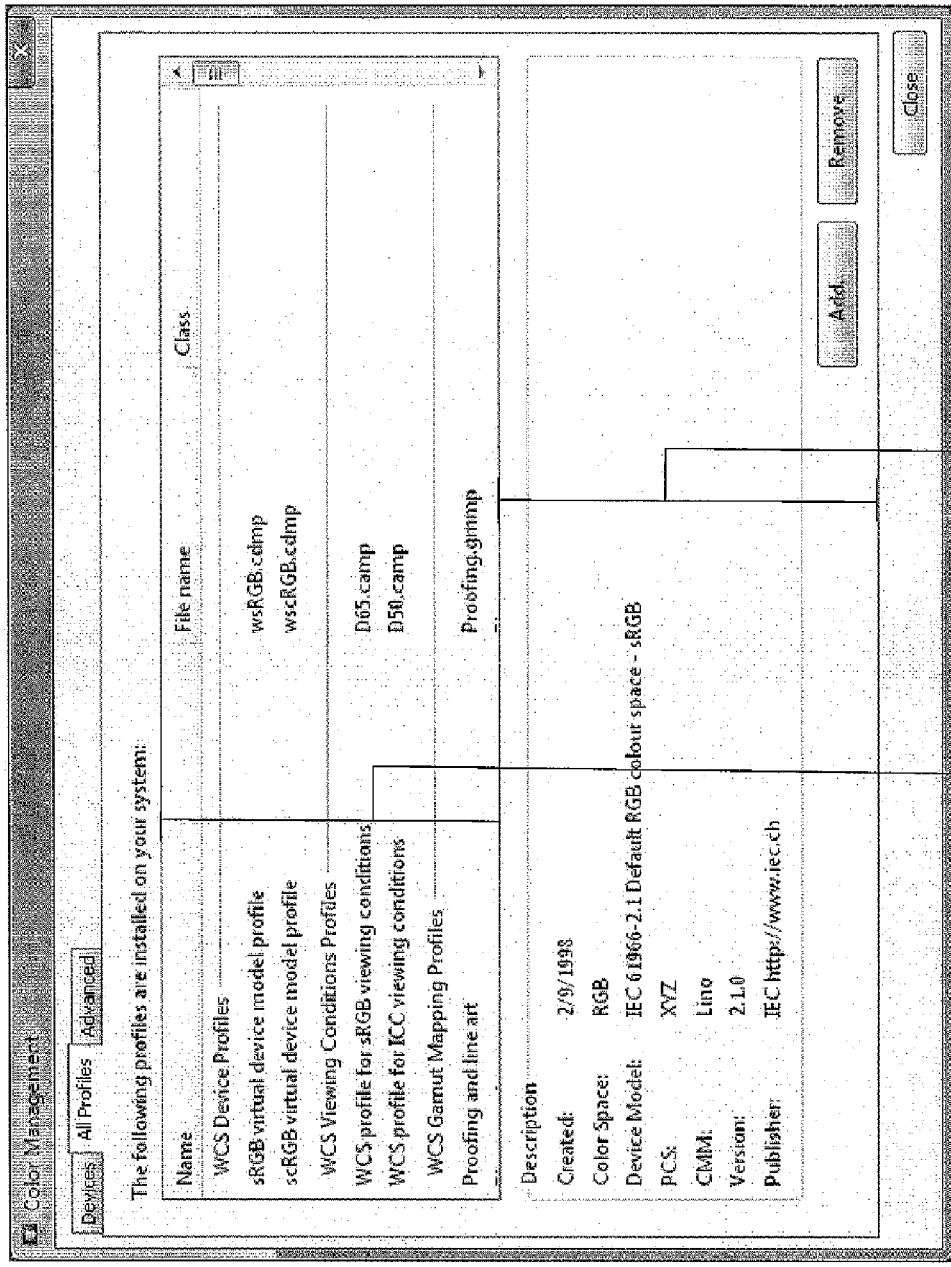
Figure 6C:
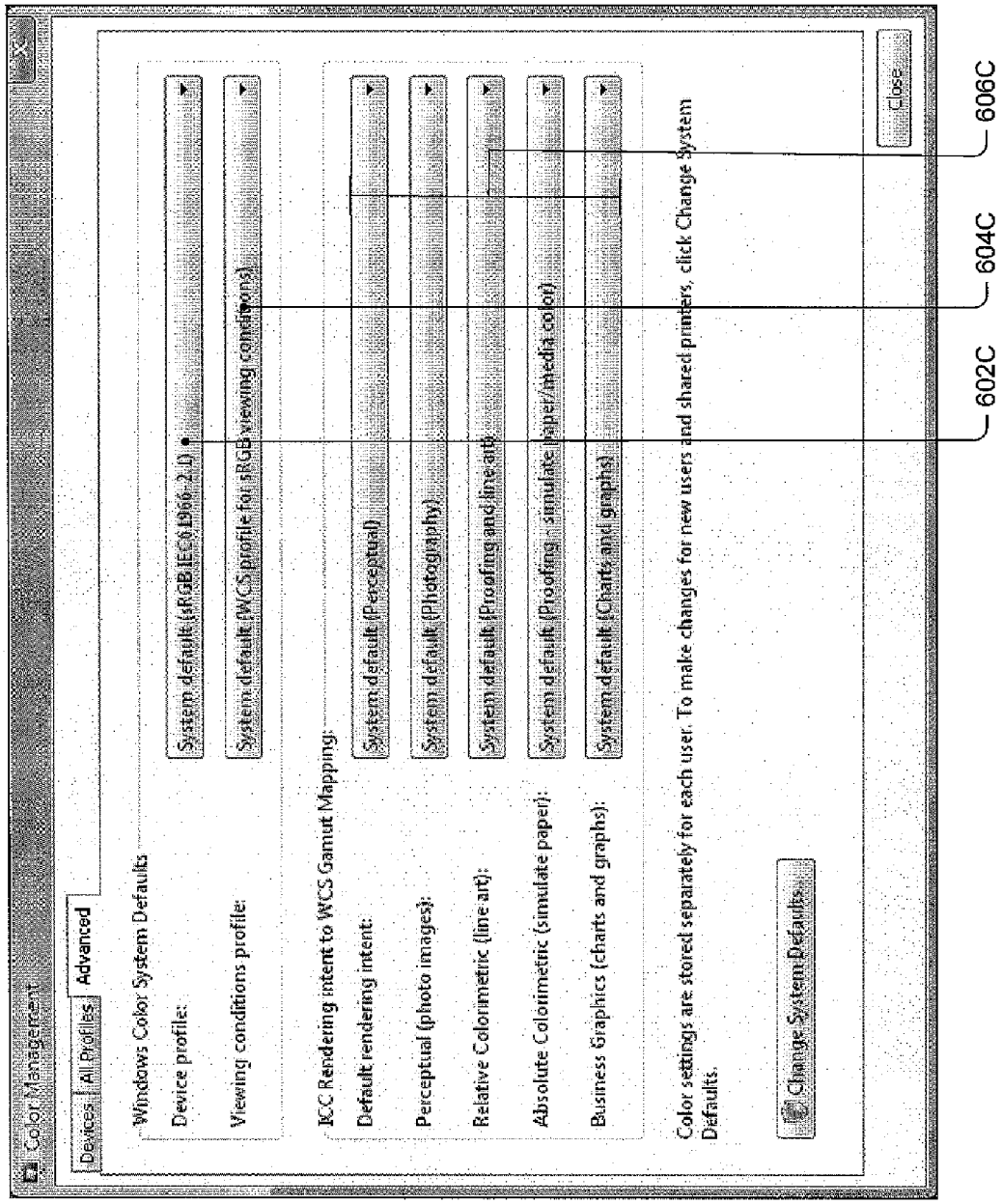

FIGS. 6A-6C illustrate an exemplary user interface in which the principles and methods described above can be implemented. While these examples illustrate a particular user interface implemented in the context of the Windows Vista® operating system, it should be noted that the principles described in this document can be utilized in connection with any user interface in any application. Furthermore, it is to be appreciated and understood that this constitutes but one example and is not to be used to limit application of the claimed subject matter. Rather, as noted above, the principles described in this document can be employed in other contexts without departing from the spirit and scope of the claimed subject matter.

In this example, the user interface labeled "Color Management" comprises three tabs, each correlating with a user screen providing a user with windows, buttons and/or checkboxes that can be used to specify preferences and/or defaults. As described above, these preferences and/or defaults can be reflected in the logic of a rule-based module that is utilized by a color management system. FIG. 6A illustrates the user interface screen labeled "Devices", FIG. 6B illustrates the interface screen labeled "All Profiles" and FIG. 6C illustrates the interface screen labeled "Advanced".

The interface screen in FIG. 6A, labeled "Devices", includes a list of profiles associated with a particular device that can be selected from a group of possible devices by using a drop-down selection window, here depicted as "Printer: Fabrikam Printomatic BCJ 4300" in drop-down selection window 602A. Correlating with drop-down selection window 602A is check box 604A which allows a user to choose whether or not to use the user's setting for the device selected in Window 602A. Also correlating with window 602A is a drop-down screen 606A, which allows a user to choose whether to manually select one or more profiles to be associated with the device identified in window 602A, or alternatively to have the profile(s) automatically selected. These profiles are defined according to standard formats defined by the International Color Consortium (ICC) and describe the color attributes of a particular device by defining mapping between devices sending input to a color management system and devices receiving output from a color management system. Recall that various devices utilize a variety of color definition systems (color spaces) and have a particular range of colors and density values they are capable of reproducing (their "gamut"). Accordingly, a color management system transforms colors from one system (color space) to the other and performs gamut mapping between the devices. By defining these profiles according to standard ICC formats, this transformation and mapping can be facilitated.

In addition, note that the interface screen depicted in FIG. 6A includes a profile button which allows the user to view and select available profiles which can be associated with the device identified in window 602A ("Profiles") by clicking an add button ("Add . . . "). Furthermore, buttons are provided which enable a user to remove and set default profiles for the device selected and identified in window 602A ("Remove" and "Set as Default Profile"). Those profiles which are associated with the device identified in window 602A are listed for the user in window 608A and can be selected and removed or set as a default by the user as described above.

Further, note that the interface screen depicted in FIG. 6A presents the user with a link, labeled "Understanding color management settings", which the user can follow to learn more about color management and the available settings. Finally, included at the bottom of the interface screen is a button that enables the user to close the color management user interface ("Close").

The interface screen in FIG. 6B, labeled "All Profiles", includes a scrolling selection window 602B which lists all the color profiles installed on the system. Note that these profiles are logically categorized as being "WCS Device Profiles", "WCS Viewing Conditions Profiles" or "WCS Gamut Mapping Profiles". These categories correspond to color profiles associated with devices, viewing conditions and gamut mapping, as described briefly in part above—and as will be understood by one skilled in the art.

In addition, note that the interface screen depicted in FIG. 6B includes window 604B which provides a detailed description for each selected profile identified in window 602B. Also included are two buttons that enable the user to add or remove the selected color profile from the system ("Add . . . " and "Remove"). Finally, included at the bottom of the interface screen is a button that enables the user to close the color management user interface ("Close").

The interface screen in FIG. 6C, labeled "Advanced", includes numerous drop-down selection windows which enable a user to specify defaults for the color management system. These defaults include a device profile default (drop-down box 602C), a viewing conditions profile default (drop-down box 604C), and various rendering intent to gamut mapping defaults (drop-down boxes 606C). As will be understood and appreciated by one skilled in the art, a device profile default describes a particular instance of a device independent of any viewing conditions while a viewing conditions profile default describes the parameters (such as white point, ambient luminance, etc) of a particular viewing condition—as described by a color appearance model. Furthermore, rendering intent to gamut mapping defaults can be used to determine which type of gamut mapping will be used with respect to applications/devices having different gamuts.

In addition, note that these defaults correspond to each specific user. Accordingly, a system default button is provided ("Change System Defaults . . . ") which enables a user to make default changes for new users and shared printers. Finally, included at the bottom of the interface screen is a button that enables the user to close the color management user interface ("Close").

Figure 7:
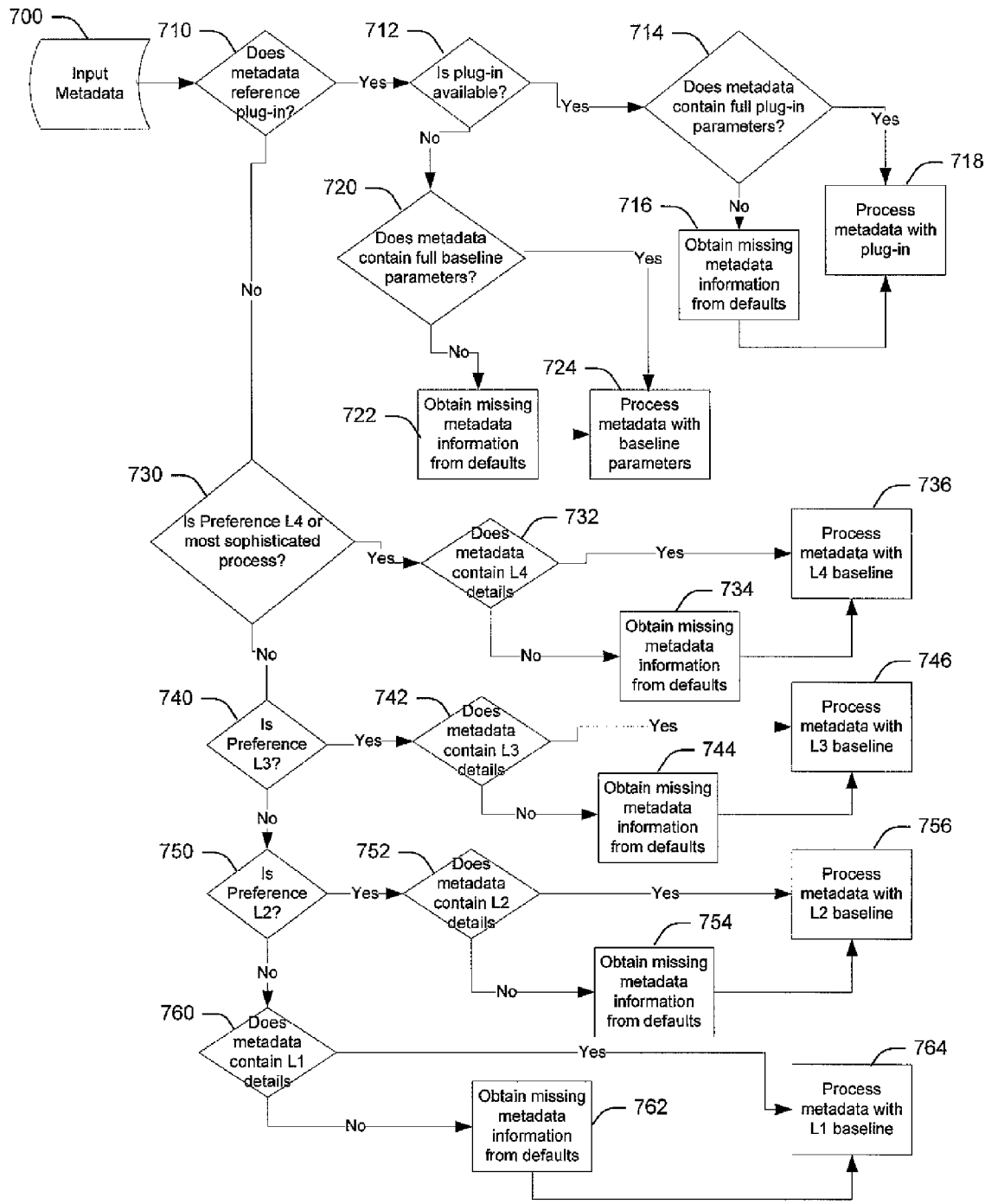
FIG. 7 illustrates an example of rule-based logic in accordance with one embodiment.

FIG. 7 illustrates exemplary rule-based logic in the form of a flow diagram that reflects preferences and/or defaults with respect to processing functionality for data and metadata in accordance with one embodiment. This logic provides but one example of how the principles and methods described above can be implemented. Therefore, it is to be appreciated and understood that other means of implementing the described embodiments can be utilized without departing from the spirit and scope of the claimed subject matter. Furthermore, recall from above that rule-based logic, such as the logic in this example, can be easily changed via a user interface such as the one described above and illustrated in FIGS. 6A-6C above.

Step 700 receives input image metadata to be analyzed by the rule-based logic. Step 710 then determines whether the metadata references functionality that has been plugged into the system ("plug-in"). Functionality can be plugged into the system in any suitable way. For instance, in at least some embodiments, a dynamic-link library (DLL) module can be utilized to provide color processing functionality associated with a third-party color appearance model that was not previously available. Here, if it is does not (the "no" branch), the logic proceeds to step 730, discussed below. However, if it does (the "yes" branch), step 712 determines whether the plug-in is available. If it is not available (the "no" branch), the logic proceeds to step 720, discussed below. However, if it is available (the "yes" branch), step 714 determines whether the metadata contains the fall plug-in parameters. The full plug-in parameters can be thought of as those parameters necessary for the metadata to be processed by the plug-in. If the metadata does not contain the full plug-in parameters (the "no" branch), step 716 obtains the missing metadata parameters from defaults and then step 718 processes the metadata with the plug-in. However, if the metadata does contain the full plug-in parameters (the "yes" branch), step 716 is not taken and step 718 processes the metadata with the plug-in.

Referring now to step 720, which is taken if the plug-in referenced by the metadata is not available, this step determines whether the metadata contains the full baseline parameters necessary for the metadata to be processed. If it does not (the "no" branch), step 722 obtains this missing metadata information from defaults and then step 724 processes the metadata with the baseline parameters. However, if the metadata does contain the full baseline parameters (the "yes" branch), step 722 is not taken and step 724 processes the metadata with the baseline parameters.

Referring now to step 730, which is taken if the metadata does not reference a plug-in, this step determines if there is a preference with respect to utilizing either a level of processing functionality designated "L4" or the most sophisticated available functionality. Note that in this example, the most sophisticated available processing functionality level is L4, which is logically considered before the less sophisticated levels, designated L3-L1. In this way, the rule-based logic is capable of providing a fall-through mechanism where the most sophisticated functionality available can be used for metadata input, when the preferences so indicate. Furthermore, as discussed above, in the context of color processing, these levels of functionality are typically associated with different color appearance models. By way of example and not limitation, processing functionality level L4 might be associated with the color appearance model named "sCAM", while levels L3-L1 might be associated with the "iCAM", "CAM" and "CAT" models respectively. Here, if there is no preference with respect to utilizing L4 or the most sophisticated available functionality (the "no" branch), the logic proceeds to step 740, discussed below. However, if there is such a preference (the "yes" branch), step 732 determines whether the metadata contains L4 details. These details can be thought of as those parameters required by one or more of the L4 algorithm(s). If it does not (the "no" branch), step 734 obtains this missing metadata information from defaults and then step 736 processes the metadata by utilizing the L4 functionality ("Process metadata with L4 baseline"). However, if the metadata does contain L4 details (the "yes" branch), step 734 is not taken and step 736 processes the metadata by utilizing the L4 functionality.

Referring now to step 740, which is taken if there are no preferences with respect to utilizing either L4 functionality or the most sophisticated functionality, this step determines if there are preferences with respect to utilizing the level of processing functionality designated "L3". Note that in this example, L3 is the next most sophisticated level of functionality after L4—with L2 and L1 being less sophisticated levels. Here, if there are no such preferences (the "no" branch), the logic proceeds to step 750, discussed below. However, if there is such a preference (the "yes" branch), step 742 determines whether the metadata contains L3 details. If it does not (the "no" branch), step 744 obtains this missing metadata information from defaults and then step 746 processes the metadata by utilizing the L3 functionality ("Process metadata with L3 baseline"). However, if the metadata does contain L3 details (the "yes" branch), step 744 is not taken and step 746 processes the metadata by utilizing the L3 functionality.

Referring now to step 750, which is taken if there are no preferences with respect to utilizing L3 functionality, this step determines if there are preferences with respect to utilizing the level of processing functionality designated "L2". Here, if there are no such preferences (the "no" branch), the logic proceeds to step 760, discussed below. However, if there is such a preference (the "yes" branch), step 752 determines whether the metadata contains L2 details. If it does not (the "no" branch), step 754 obtains this missing metadata information from defaults and then step 756 processes the metadata by utilizing the L2 functionality ("Process metadata with L2 baseline"). However, if the metadata does contain L2 details (the "yes" branch), step 754 is not taken and step 756 processes the metadata by utilizing the L2 functionality.

Referring now to step 760, which is taken if there are no preferences with respect to utilizing L2 functionality, this step determines whether the metadata contains L1 details. Note that in this example, L1 functionality is the fall-through level of processing functionality for metadata when the preferences do not indicate that the most sophisticated functionality should be utilized. As such, there is no determination whether there are preferences with respect to utilizing this level because all metadata not processed by more sophisticated functionality is, by default, processed by utilizing L1 functionality. Here, if the metadata does not contain L1 details (the "no" branch), step 762 obtains this missing metadata information from defaults and then step 764 processes the metadata by utilizing the L1 functionality ("Process metadata with L1 baseline"). However, if the metadata does contain L1 details (the "yes" branch), step 762 is not taken and step 764 processes the metadata by utilizing the L1 functionality.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of providing a layered approach to developing operating-system platform components, the method comprising:

providing, by a computing device configured to utilize one or more existing application program interfaces (APIs), new processing functionality to the operating-system platform components that are associated with the one or more existing APIs without modifying the one or more APIs, receiving, by the computing device, image input associated with the new processing functionality via one or more of the unmodified existing APIs, wherein the received image input passed through and was ignored by the unmodified existing APIs because the received image input was part of one or more tagged portions of a metadata structure recognized by the unmodified existing APIs; and determining, by a rule-based module of the computing device, an appropriate processing functionality for the image input, the determining by the rule-based module comprising:

receiving the image input, wherein the image input comprises metadata;

highest-level-of-sophistication determining whether the image input metadata references a highest level of sophistication of available processing functionality;

in an event that the image input metadata does not reference the highest level of sophistication of available processing functionality, intermediate-level-of-sophistication determining whether the input metadata references an intermediate level of sophistication of available processing functionality;

in an event that the image input metadata does not reference the highest level of sophistication nor any intermediate level of sophistication of available processing functionality, lowest-level-of-sophistication determining whether the image input metadata references a lowest level of sophistication of available processing functionality; and in response to one or more of the highest-level-of-sophistication, intermediate-level-of -sophistication, and lowest-level-of-sophistication determinations, selecting the determined level of sophistication of available processing functionality.

2. The method of claim 1, wherein the operating-system platform components comprises a color management system.

3. The method of claim 2, wherein new processing functionality is provided by making one or more color appearance models available to one or more processing modules associated with the color management system.

4. The method of claim 1, wherein the appropriate processing functionality comprises one or more of:

legacy processing functionality;

current processing functionality; and the new processing functionality.

5. The method of claim 1, wherein the determination made by the rule-based module considers at least one of:
- characteristics of one or more objects associated with the image input; or
- user-defined preferences.

6. The method of claim 1, the rule-based module being part of an operating-system registry.

7. The method of claim 1, further comprising:
- associating the image input with the appropriate processing functionality; and
- processing one or more objects associated with the image input using said appropriate processing functionality.

8. The method of claim 1, wherein the determining by the rule-based module further comprises:
- checking whether the input metadata contains sufficient details to perform the selected level of sophistication of available processing functionality; and
- in response to the checking, obtaining missing metadata information from defaults to have sufficient details to perform the selected level of sophistication of available processing functionality.

9. One or more computer-readable media having computer-readable instructions thereon which, when executed by a computing device, implement a method comprising:
- providing, by the computing device configured to utilize one or more existing application program interfaces (APIs), new processing functionality to the operating-system platform components that are associated with the one or more existing APIs without modifying the one or more APIs,
- receiving, by the computing device, image input associated with the new processing functionality via one or more of the unmodified existing APIs, wherein the received image input passed through and was ignored by the unmodified existing APIs because the received image input was part of one or more tagged portions of a metadata structure recognized by the unmodified existing APIs; and
- determining, by a rule-based module of the computing device, an appropriate processing functionality for the image input, the determining by the rule-based module comprising:
  - receiving the image input, wherein the image input comprises metadata;
  - highest-level-of-sophistication determining whether the image input metadata references a highest level of sophistication of available processing functionality;
  - in an event that the image input metadata does not reference the highest level of sophistication of available processing functionality, intermediate-level-of-sophistication determining whether the input metadata references an intermediate level of sophistication of available processing functionality;
  - in an event that the image input metadata does not reference the highest level of sophistication nor any intermediate level of sophistication of available processing functionality, lowest-level-of-sophistication determining whether the image input metadata references a lowest level of sophistication of available processing functionality; and
  - in response to one or more of the highest-level-of-sophistication, intermediate-level -of-sophistication, and lowest-level-of-sophistication determinations, selecting the determined level of sophistication of available processing functionality.

10. A system for processing image input comprising:
- one or more processors;
- one or more memories;
- a rule-based module configured to receive the image input associated with one or more objects via an application program interface (API) module and determine an appropriate processing functionality for the image input;
- one or more processing modules configured to provide an appropriate processing functionality, wherein the one or more processing modules provide:
  - functionality associated with legacy processing capabilities;
  - functionality associated with current processing capabilities; and
  - functionality associated with new processing capabilities made available subsequent to any modification to the API module,
- the rule-based module being further configured to use a user-selected preferred color appearance model in an event of a failure to detect that the image input references a level of functionality associated with either the current processing capabilities or the new processing capabilities,
- wherein one or more of the modules comprises computer-executable instructions that are stored in the one or more memories and perform their configured functionality when executed by the one or more processors.

11. The system of claim 10, wherein the processing capabilities are associated with one or more color appearance models.

12. The system of claim 10, wherein a determination is made by considering at least one of:
- characteristics of one or more objects associated with the image input; or
- user-defined preferences.

13. The system of claim 12, wherein one or more characteristics include the type of metadata that comprises one or more of the objects.

14. The system of claim 10, wherein the rule-based module and one or more processing modules are communicatively linked via an internal interface.

15. The system of claim 10, wherein the rule-based module is further configured to select the one or more processing modules that provide the functionality associated with new processing capabilities in an event of a detection that the image input references a level of functionality associated with the new processing capabilities.

16. A computer-implemented method of providing a layered approach to developing operating-system platform components, the method comprising:
- providing, by a computing device configured to utilize an application program interface (API), image input comprising data and metadata associated with one or more color appearance models to a rule-based module of the computing device via operating-system platform components that comprise the API, wherein the provided image input passed through and was ignored by the API because the provided image input was part of one or more unprocessed portions of a metadata structure recognized by the API;
- providing, by the computing device, options for processing the image input, wherein the options comprise:
  - utilizing legacy processing capabilities for processing;
  - utilizing current processing capabilities for processing; and
  - utilizing new processing capabilities made available subsequent to any changes to the API for processing; and
- determining, by the rule-based module of the computing device, which option is used to process the image input.

17. The method of claim 16, further comprising:
   providing the image input to a processing module; and
   processing the image input and providing the result for consumption.

18. The method of claim 16, wherein determining includes utilizing logic in the rule-based module based on one or both of:
   one or more characteristics of the one or more objects; and
   user-defined preferences.

19. A computing device comprising:
   one or more processors;
   one or more computer-readable media; and
   computer-readable instructions on the one or more computer-readable media which, when executed by the one or more processors, cause the one or more processors to implement a method comprising:
      providing, by a computing device configured to utilize an application program interface (API), image input comprising data and metadata associated with one or more color appearance models to a rule-based module of the computing device via operating-system platform components that comprise the API, wherein the provided image input passed through and was ignored by the API because the provided image input was part of one or more unprocessed portions of a metadata structure recognized by the API;
      providing, by the computing device, options for processing the image input, wherein the options comprise:
      utilizing legacy processing capabilities for processing;
      utilizing current processing capabilities for processing; and
      utilizing new processing capabilities made available subsequent to any changes to the API for processing; and
      determining, by the rule-based module of the computing device, which option is used to process the image input.

* * * * *